United States Patent [19]

Iqbal et al.

[11] 4,355,159
[45] Oct. 19, 1982

[54] NICKEL COMPLEX PIGMENTS OF AZINES

[75] Inventors: Abul Iqbal, Ettingen; Paul Lienhard, Frenkendorf; André Pugin, Riehen, all of Switzerland

[73] Assignee: Ciba-Geigy Corporation, Ardsley, N.Y.

[21] Appl. No.: 149,406

[22] Filed: May 13, 1980

[30] Foreign Application Priority Data

May 23, 1979 [CH] Switzerland .................. 4842/79

[51] Int. Cl.³ .......................................... C07D 403/12
[52] U.S. Cl. .................................... 542/417; 548/105
[58] Field of Search ......................... 542/417; 548/105

[56] References Cited

U.S. PATENT DOCUMENTS

| | | | |
|---|---|---|---|
| 3,974,149 | 8/1976 | L'Eplattenier et al. | 542/417 |
| 4,022,770 | 5/1977 | L'Eplattenier et al. | 542/417 |
| 4,024,132 | 5/1977 | L'Eplattenier et al. | 542/417 |
| 4,111,947 | 9/1978 | L'Eplattenier et al. | 542/417 |
| 4,132,708 | 1/1979 | L'Eplattenier et al. | 542/417 |

Primary Examiner—Arthur P. Demers
Attorney, Agent, or Firm—Luther A. R. Hall

[57] ABSTRACT

1:1 Nickel complexes of azines of the formula I or of a tautomer thereof

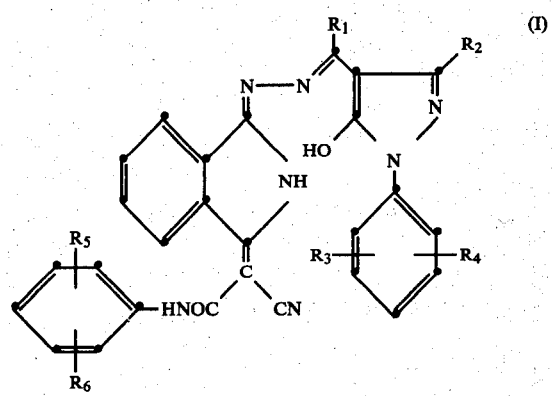

wherein $R_1$ is hydrogen or methyl, $R_2$ is methyl or carbamoyl, $R_3$ is hydrogen or chlorine, $R_4$ is hydrogen, chlorine, methyl, trifluoromethyl or sulfamoyl, $R_5$ is hydrogen or chlorine, $R_6$ is hydrogen, chlorine, bromine, methyl, methoxy, trifluoromethyl, carbamoyl or alkanoylamino containing 2 to 4 carbon atoms, with the proviso that, if $R_2$ is carbamoyl, at least two of the substituents $R_3$ to $R_6$ are halogen atoms and/or trifluoromethyl groups, color plastics, lacquers and printing inks in orange to red shades of outstanding fastness properties.

2 Claims, No Drawings

NICKEL COMPLEX PIGMENTS OF AZINES

The present invention relates to 1:1 nickel complexes of azines of the formula I or of a tautomer thereof

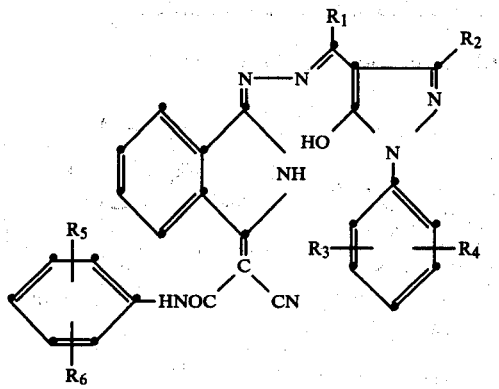

wherein $R_1$ is hydrogen or methyl, $R_2$ is methyl or carbamoyl, $R_3$ is hydrogen or chlorine, $R_4$ is hydrogen, chlorine, methyl, trifluoromethyl or sulfamoyl, $R_5$ is hydrogen or chlorine, $R_6$ is hydrogen, chlorine, bromine, methyl, methoxy, trifluoromethyl, carbamoyl or alkanoylamino containing 2 to 4 carbon atoms, with the proviso that, if $R_2$ is carbamoyl, at least two of the substituents $R_3$ to $R_6$ are halogen atoms and/or trifluoromethyl groups.

Preferred metal complexes are those of the formula I, wherein $R_1$ is hydrogen, $R_2$ is methyl, $R_3$ is hydrogen or chlorine, $R_4$ is hydrogen, chlorine, methyl or trifluoromethyl, $R_5$ is chlorine, and $R_6$ is hydrogen, chlorine, methyl or trifluoromethyl. The nickel complexes of the above mentioned azines are also preferred.

The azines of the formula I are obtained by methods known per se by condensation of the hydrazone of the formula

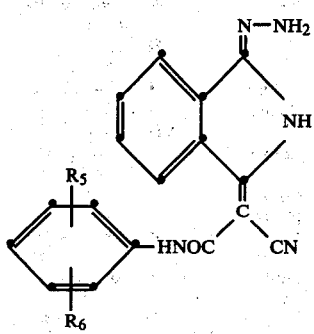

wherein $R_5$ and $R_6$ are as defined above, with an oxo compound of the formula

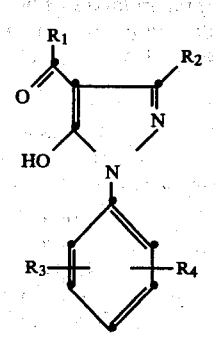

wherein $R_1$, $R_2$, $R_3$ and $R_4$ are as defined above, or with a functional derivative thereof, for example an anil.

The reaction is carried out preferably in the temperature range between 50° and 130° C. in water or an organic solvent, such as methanol, ethanol, glacial acetic acid, dioxane, dimethyl formamide, N-methylpyrrolidone, butyrolactone, glycol monomethyl ether or o-dichlorobenzene.

As the azines are ordinarily reluctantly soluble in the solvents employed in the reaction, they can be easily isolated by filtration. Any impurities can be washed out.

For conversion into the metal complexes, the azines of the formula I are treated with nickel donors, preferably formates, acetates or stearates of nickel. The metallisation takes place e.g. in water, with or without the addition of a dispersant, but advantageously in one of the solvents indicated above.

The colourants of this invention are valuable pigments which can be used in finely dispersed form for pigmenting organic material of high molecular weight, e.g. cellulose ethers and esters, such as ethyl cellulose, nitrocellulose, cellulose acetate, cellulose butyrate, natural resins or synthetic resins, such as polymerisation resins or condensation resins, e.g. aminoplasts, especially urea-formaldehyde and melamine-formaldehyde resins, alkyd resins, phenolic plastics, polycarbonates, polyolefins such as polystyrene, polyvinyl chloride, polyethylene, polypropylene, polyacrylonitrile, polyacrylates, polyamides, polyurethanes or polyesters, rubber, casein, silicone and silicone resins, singly or in mixtures.

It is immaterial whether these high molecular weight compounds are in the form of plastics, melts, or of spinning solutions, lacquers, paints or printing inks. Depending on the end use, it is advantageous to use the novel pigments as toners or in the form of preparations.

The colourations obtained are distinguished by good general pigment properties, especially by excellent fastness to light, heat, atmospheric influences, overstripe bleeding and migration, by surface gloss and by great brilliance of shade surprising for metal complexes and by high colour strength. The pigments have little influence on the mechanical properties of the substrates and, in particular, they do not promote the distortion characteristics of articles made of plastics. Pigmented fibres have in general excellent fastness properties.

The pigments can be employed in the form in which they are obtained in the synthesis or in slightly comminuted form, in which case they produce opaque colourations. However, they can also be subjected to intense grinding, whereupon they produce transparent colourations, for example strong metallic effect finishes. A further advantage of the novel pigments is their good dispersibility, for example in lacquers and plastics. Mill base formulations of the pigments in lacquers are distinguished by advantageous flow properties.

EXAMPLE 1

5.06 g of 1-(cyano-p-chlorophenylcarbamoylmethylene)-3-hydrazono-isoindoline (prepared from 1-(cyano-p-chlorophenylcarbamoylmethylene)-3-iminoisoindoline and hydrazine hydrate) and 4.6 g of 1-p-chlorophenyl-3-methyl-4-anilinomethylene-5-pyrazolone are stirred in 150 ml of glacial acetic acid for 1 hour at 100° C. The reaction mixture is filtered hot. The filter residue is washed thoroughly with glacial acetic acid and ethanol and dried in vacuo at 80° C., affording 3.3 g (39.5% of theory) of a red orange colourant of the constitution $C_{28}H_{19}Cl_2N_7O_2$.

The reaction of the resultant ligand with nickel acetate . 4 $H_2O$ (theory + 10% excess) in 50 ml of dimethyl formamide for 2½ hours at 110° C. produces a 1:1 nickel (2) complex (18% of theory) of the formula

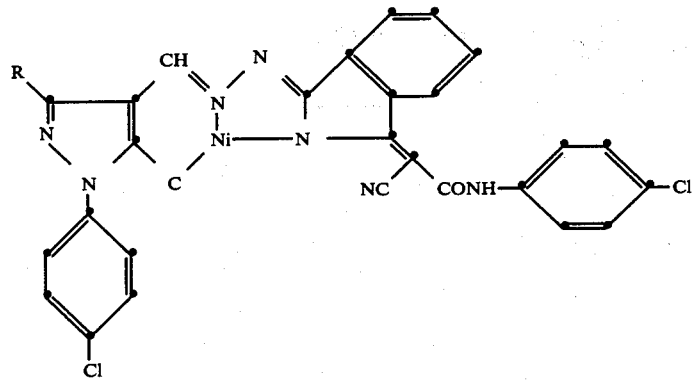

(R=$CH_3$) which colours PVC and lacquers in scarlet shades of excellent fastness to light, atmospheric influences and migration.

| Microanalysis $C_{28}H_{17}Cl_2N_7NiO_2$ (mol. wt. 613.1) | | | | |
|---|---|---|---|---|
|  | C | H | N | Ni |
| % calculated | 54.85 | 2.8 | 15.99 | 9.58 |
| % found | 54.6 | 2.7 | 16.1 | 9.62 |

EXAMPLE 2

84.44 g (0.25 mole) of 1-(cyano-p-chlorophenylcarbamoylmethylene)-3-hydrazino-isoindoline (prepared from 1-(cyano-p-chlorophenylcarbamoylmethylene)-3-iminoisoindoline and hydrazine hydrate) and 85.1 g (0.25 mole) of 1-p-chlorophenyl-3-carbamoyl-4-anilinomethylene-5-pyrazolone are stirred in 800 ml of dimethyl formamide for 2½ hours at 130°–140° C. To the resultant dark solution are added 68.5 g of nickel acetate . 4$H_2O$ (10% excess) and the reaction mixture is stirred for a further 2½ hours at 120°–125° C. The reaction product is filtered off hot and the filter residue is washed thoroughly with dimethyl formamide and ethanol and dried at 80° C. in vacuo, affording 26.2 g (16.3% of theory) of an orange red nickel complex of the constitution $C_{28}H_{16}Cl_2N_8NiO_3$ and of the formula IV (only one of the possible isomeric or tautomeric forms has been considered), wherein R is $CONH_2$.

The above 1:1 $Ni^{+2}$ complex colours PVC and lacquers in orange shades of excellent fastness to light, atmospheric influences and migration.

| Microanalysis $C_{28}H_{16}Cl_2N_8NiO_3$ | | | | |
|---|---|---|---|---|
|  | C | H | N | Ni |
| % calculated | 52.3 | 2.7 | 17.4 | 8.94 |
| % found | 52.38 | 2.51 | 17.45 | 9.14 |

The 1:1 nickel complexes of the formula

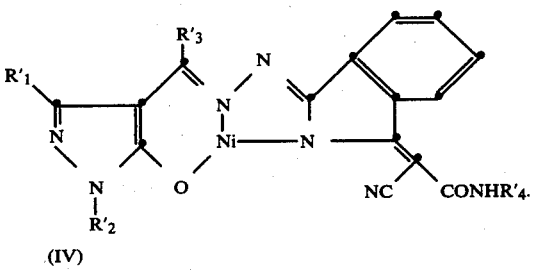

(IV)

(for simplicity's sake, only one of the possible isomeric or tautomeric forms has been considered here) are synthesised in accordance with the procedure of this Example $R_1'$, $R_2'$, $R_3'$ and $R_4'$ have the meanings indicated in Table I.

TABLE I

| Example | $R'_1$ | $R'_2$ | $R'_3$ | $R'_4$ | Shade in PVC |
|---|---|---|---|---|---|
| 3 | $CH_3$— | p-chlorophenyl | $CH_3$ | p-chlorophenyl | scarlet |
| 4 | $CH_3$— | phenyl | H | 3,4-dichlorophenyl | scarlet |
| 5 | $H_2NOC$— | phenyl | H | 3,4-dichlorophenyl | orange |
| 6 | $CH_3$— | p-chlorophenyl | H | 3,4-dichlorophenyl | orange |
| 7 | $CH_3$— | p-chlorophenyl | H | 3-chloro-4-carbamoylphenyl | scarlet |
| 8 | $CH_3$— | m-chlorophenyl | H | p-chlorophenyl | scarlet |
| 9 | $CH_3$— | p-chlorophenyl | H | 2-methoxy-5-chlorophenyl | orange |
| 10 | $CH_3$— | p-chlorophenyl | H | o-chlorophenyl | orange |
| 11 | $CH_3$— | p-chlorophenyl | H | 2,4-dichlorophenyl | orange-red |
| 12 | $CH_3$— | p-chlorophenyl | H | 3-chloro-4-methylphenyl | orange-red |

TABLE I-continued

| Example | R'$_1$ | R'$_2$ | R'$_3$ | R'$_4$ | Shade in PVC |
|---|---|---|---|---|---|
| 13 | CH$_3$— | p-chlorophenyl | H | m-chlorophenyl | orange |
| 14 | CH$_3$— | 2,5-dichlorophenyl | H | phenyl | red |
| 15 | CH$_3$— | 3-sulfamoylphenyl | H | 3,4-dichlorophenyl | orange |
| 16 | —CONH$_2$ | p-chlorophenyl | H | 3-trifluoromethylphenyl | orange |
| 17 | CH$_3$— | m-chlorophenyl | H | p-chlorophenyl | orange-red |
| 18 | —CONH$_2$ | p-chlorophenyl | H | 2-methyl-4-chlorophenyl | orange |
| 19 | —CONH$_2$ | p-chlorophenyl | H | m-chlorophenyl | orange |
| 20 | —CONH$_2$ | p-chlorophenyl | H | 3-chloro-4-methylphenyl | orange |
| 21 | —CONH$_2$ | p-chlorophenyl | H | 2-methoxy-5-chlorophenyl | orange |
| 22 | —CONH$_2$ | p-chlorophenyl | H | 2-methyl-3-chlorophenyl | orange |
| 23 | —CONH$_2$ | p-methylphenyl | H | 3,4-dichlorophenyl | orange |
| 24 | —CONH$_2$ | m-chlorophenyl | H | 3-chloro-4-methylphenyl | orange |
| 25 | —CONH$_2$ | p-chlorophenyl | H | 3,4-dichlorophenyl | orange |
| 26 | CH$_3$— | 2,5-dichlorophenyl | H | 3-chloro-4-methylphenyl | red |
| 27 | CH$_3$— | 2,5-dichlorophenyl | H | p-methoxyphenyl | red |
| 28 | —CH$_3$ | m-trifluoromethylphenyl | H | m-trifluoromethylphenyl | orange-red |
| 29 | —CH$_3$ | m-trifluoromethylphenyl | H | p-chlorophenyl | orange-red |
| 30 | —CH$_3$ | p-chlorophenyl | H | m-trifluoromethylphenyl | orange-red |
| 31 | —CH$_3$ | 2,5-dichlorophenyl | H | p-bromophenyl | red |

EXAMPLE 32

34.38 g (0.17 mole) of 1-phenyl-3-methyl-4-formyl-5-pyrazolone and 51.51 g (0.17 mole) of 1-(cyanophenylcarbamoylmethylene)-3-hydrazono-isoindoline (prepared from 1-(cyanophenylcarbamoylmethylene)-3-iminoisoindoline and hydrazine hydrate) are stirred in 1000 ml of ethyl cellosolve for 3 hours at 110°–115° C. The resultant brown suspension is cooled to 90° C. and filtered. The filter cake is washed with ethyl cellosolve and ethyl alcohol and dried in vacuo overnight at 80° C., affording 57 g (69% of theory) of the ligand in the form of a brown powder.

| Microanalysis C$_{28}$H$_{21}$N$_7$O$_2$ mol. wt. 487.52 | | | |
|---|---|---|---|
| calculated | 68.98% C | 4.34% H | 20.11% N |
| found | 68.6% C | 4.4% H | 20.4% N |

The reaction of 46.8 g (0.096 mole) of the above ligand with 26.3 g (0.105 mole) of nickel acetate.4 H$_2$O in 800 ml of dimethyl formamide for 4 hours at 120°–125° C. yields 20.3 g (39% of theory) of an orange-red nickel complex of the constitution

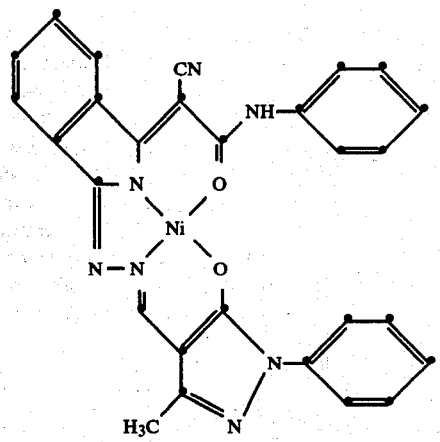

| Microanalysis C$_{28}$H$_{19}$N$_7$O$_2$Ni mol. wt. 544.21 | | | | |
|---|---|---|---|---|
| calculated | 61.80% C | 3.25% H | 18.02% N | 10.79% Ni |
| found | 62.4% C | 3.7% H | 17.9% N | 11.4% Ni |

The resultant nickel complex pigment colours plastics and lacquers in scarlet shades of excellent fastness properties.

EXAMPLES 33–37

The 1:1 nickel complexes of the formula

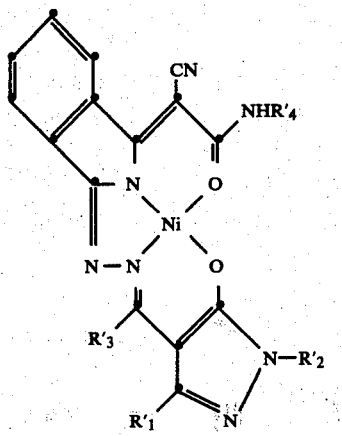

(for simplicity's sake, only one of the possible isomeric or tautomeric forms has been considered here) are synthesised in accordance with the procedure of Example 2. R$_1'$, R$_2'$, R$_3'$ and R$_4'$ have the meanings indicated in Table II. The starting materials can be obtained by known methods.

TABLE II

| Example | R'$_1$ | R'$_2$ | R'$_3$ | R'$_4$ | Shade in PVC |
|---|---|---|---|---|---|
| 33 | CH$_3$ | p-methylphenyl | H | p-chlorophenyl | red |
| 34 | CH$_3$ | p-chlorophenyl | H | p-acetylaminophenyl | red |
| 35 | CH$_3$ | p-chlorophenyl | H | o-methoxyphenyl | orange |
| 36 | CH$_3$ | 3-sulfamoylphenyl | H | 3,4-dichlorophenyl | red |
| 37 | CH$_3$ | p-methylphenyl | CH$_3$ | phenyl | red |

EXAMPLE 38

10 g of titanium dioxide and 2 g of the pigment obtained in Example 1 are ground for 48 hours in a ball mill with 88 g of a mixture of 26.4 g of coconut alkyd resin, 24 g of melamine/formaldehyde resin (50% solids content), 8.8 g of ethylene glycol monomethyl ether and 28.8 g of xylene. The resultant lacquer is sprayed onto an aluminium sheet, predried for 30 minutes at room temperature, and then stoved for 30 minutes at 120° C. A scarlet finish of very good fastness to overstripe bleeding, light and atmospheric influences is obtained.

EXAMPLE 39

A laboratory kneader having a capacity of 250 parts by volume is charged with 25 parts of the pigment obtained in Example 1, 100 parts of finely ground sodium chloride and 30 parts of diacetone alcohol. The mixture is kneaded for 5 hours with cooling and then discharged into 4000 parts by volume of water. Sodium chloride and diacetone alcohol go into solution and the pigment precipitates. The suspension is filtered and the filter cake is washed thoroughly with water and dried in a vacuum drying cabinet at 80° C.

EXAMPLE 40

65 parts of stabilised polyvinyl chloride, 35 parts of dioctyl phthalate and 0.2 part of the pigment obtained in Example 39 are stirred together and then rolled for 7 minutes at 160° C. on a two-roll calender to produce an orange-red sheet of very good fastness to light and migration.

EXAMPLE 41

The procedure of Example 39 is repeated, except that 2.78 parts of Staybelite Resin (available from HERCULES) are added to the kneading stock. The resultant product is a pigment with a 10% resin content which can be more easily incorporated and having improved dispersibility.

EXAMPLE 42

75 parts of stabilised polyvinyl chloride, 35 parts of dioctyl phthalate and 0.2 part of the pigment obtained in Example 1 are processed to a sheet as described in Example 35. After cooling, this sheet is rolled for 7 minutes at room temperature and then for 7 minutes at 160° C. The strong orange-red colouration obtained is distinguished by good levelness and good hiding power.

EXAMPLE 43

4 parts of the finely dispersed pigment of Example 1 are stirred into 20 parts of solvent of the following composition: 50 parts of Solvesso 150 (mixture of aromatic hydrocarbons), 15 parts of butylacetate, 5 parts of Exkin II (ketoxime-based levelling agent), 25 parts of methyl isobutyl ketone, 5 parts of silicone oil (1% in Solvesso 150). After complete dispersion has been attained (in about 15–60 minutes, depending on the type of stirrer), the binders are added, namely 48.3 parts of Baycryl L 530 (acrylic resin; 51% in xylene/butanol 3:1) and 23.7 parts of Maprenal TTX (melamine resin; 55% in butanol).

The batch is briefly homogenised and the resultant lacquer is then applied by conventional methods, such as spraying or dipping) or - particularly for the continuous coating of sheet metal - by the coil-coating method, and stoved (30 minutes at 130° C.). The red finishes obtained are distinguished by very good levelness, high gloss and excellent dispersion of the pigment, as well as by excellent fastness to atmospheric influences.

What is claimed is:

1. The nickel complex pigment having the formula

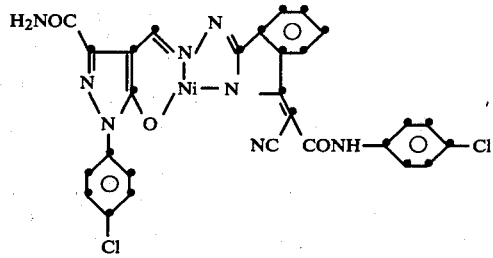

or a tautomer thereof.

2. The nickel complex pigment having the formula

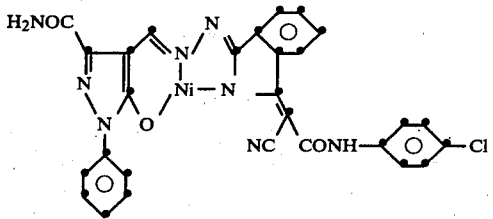

or a tautomer thereof.

* * * * *